Figure 1:
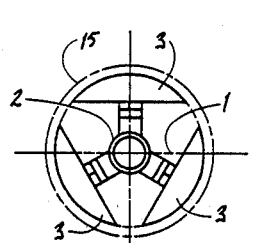

United States Patent [19]

Warthmann

[11] 4,401,497
[45] Aug. 30, 1983

[54] METHOD AND APPARATUS FOR BUTT WELDING OF PLASTIC PIPES OF LARGE DIAMETER

[76] Inventor: Robert Warthmann, Steinmueri 2, Volketswil, Switzerland

[21] Appl. No.: 323,035

[22] Filed: Nov. 19, 1981

[30] Foreign Application Priority Data

Nov. 27, 1980 [CH] Switzerland ............... 8802/80

[51] Int. Cl.³ .................................. B29C 27/02
[52] U.S. Cl. ............... 156/267; 156/273.3; 156/304.2; 156/304.5; 156/304.6; 156/379.8; 156/391; 156/499; 156/502; 156/509; 156/558
[58] Field of Search ............ 156/304.2, 158, 267, 156/304.5, 304.6, 391, 392, 499, 502, 509, 558, 559, 256, 273.3, 296, 309.9, 379.8

[56] References Cited

U.S. PATENT DOCUMENTS

| | | | |
|---|---|---|---|
| 3,729,360 | 4/1973 | McElroy | 156/158 |
| 3,793,119 | 2/1974 | Province | 156/499 |
| 3,846,208 | 11/1974 | McElroy | 156/499 |
| 4,054,473 | 10/1977 | Ohnstad | 156/304.2 |
| 4,338,153 | 7/1982 | Zimmerman | 156/304.2 |

Primary Examiner—Michael G. Wityshyn
Attorney, Agent, or Firm—Zarley, McKee, Thomte, Voorhees & Sease

[57] ABSTRACT

The welding apparatus serves for the purpose of butt-welding of plastic pipes of diameters larger than 500 mm. All the work is performed by means of the welding apparatus from inside the pipe. Thereby the working time is reduced, the welding quality ensured, and the installation becomes faster. Lifting cranes and heating tents become unnecessary. A novelty is also the possibility of welding pipes together at an angle position. As the welding apparatus is collapsible, it may also be advantageously used for repair work on old pipes in the ground (relining), with a minimum exposure of the pipes.

8 Claims, 13 Drawing Figures

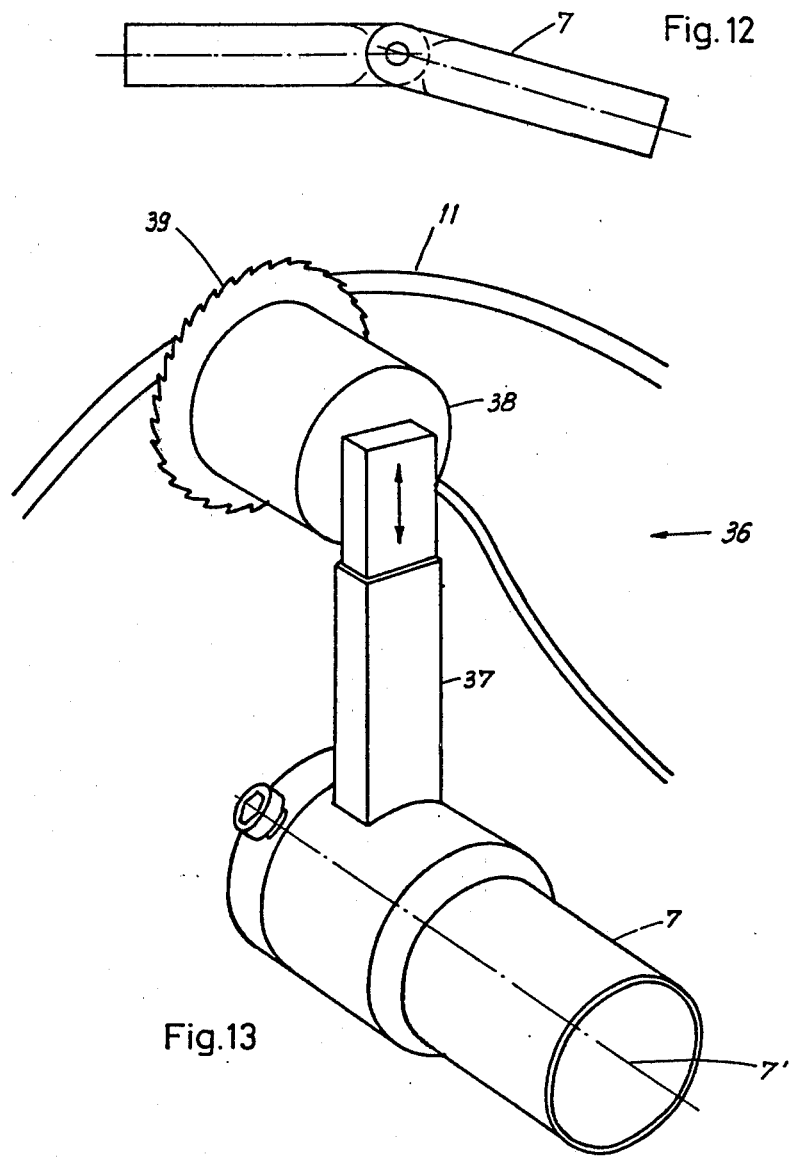

METHOD AND APPARATUS FOR BUTT WELDING OF PLASTIC PIPES OF LARGE DIAMETER

The invention is concerned with a method and an apparatus for welding plastic pipes of large diameter, the welding apparatus being placed inside the pipe.

The practice of joining small and large plastic pipes by means of butt welding is well known. In that connection the pipe ends are first cut off precisely by turning by means of an apparatus. Thereupon a heating reflector is inserted between the pipe ends for the purpose of heating. As soon as the plastic has become sufficiently soft, the heating reflector is removed and the pipe ends are pressed together. After cooling, the weld is ready. All of the operations are performed from outside. The operations must be performed within very narrow tolerances in order to prepare a good pipe joint.

In the case of pipes of large diameter, i.e. 160 mm and larger, the prior art method involves the following drawbacks:

the apparatus has a large weight, therefore it can be operated only by means of a crane, the operation of the turning device and of the heating reflector are possible only by means of a crane, the pulling off of the ready-welded pipe likewise requires a crane, at construction sites, especially in canals, angle weldings cannot be performed at all, because the necessary journalling or guiding would be too expensive.

It is an object of the present invention to eliminate these drawbacks and to provide further advantages. This is achieved so that the welding apparatus is placed inside the pipe and that all the operations can be performed from inside the pipe. Only the controlling of the individual operations takes place from outside.

Below, an example in accordance with the invention will be described in more detail with the aid of drawings.

Figure 2:
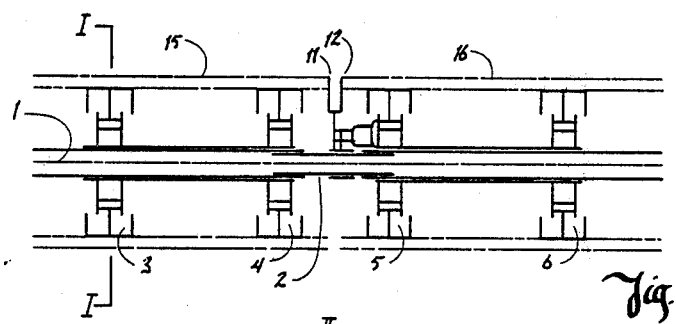
Figure 3:
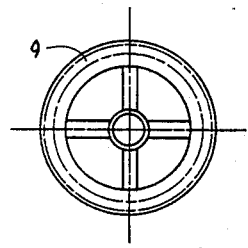
Figure 4:
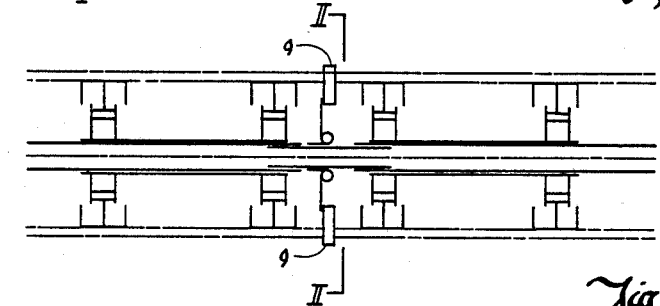
Figure 5:
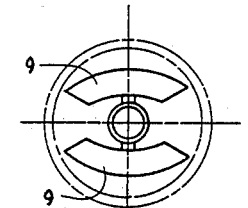
Figure 6:
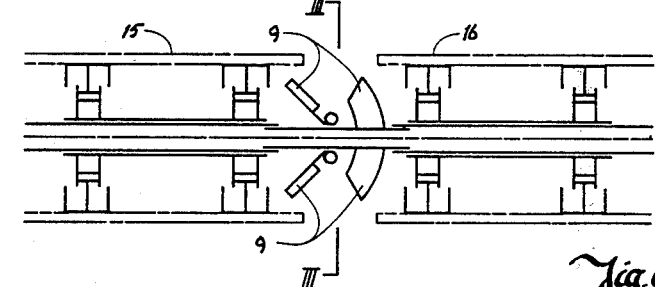
Figure 7:
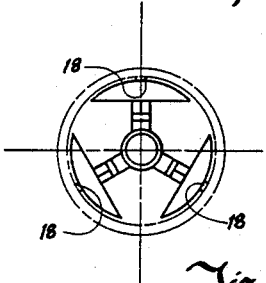
Figure 8:
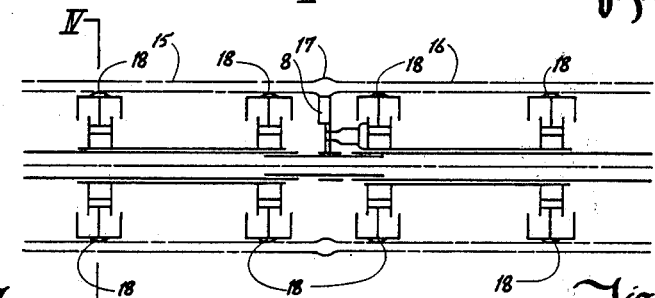
Figure 9:
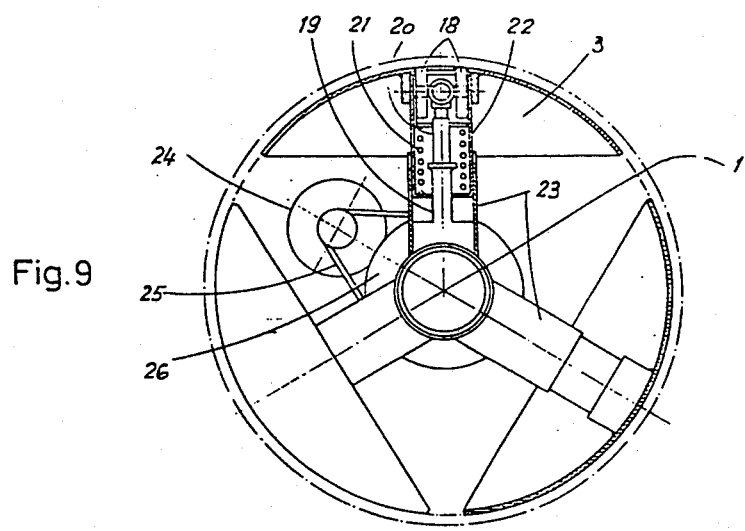
Figure 10:
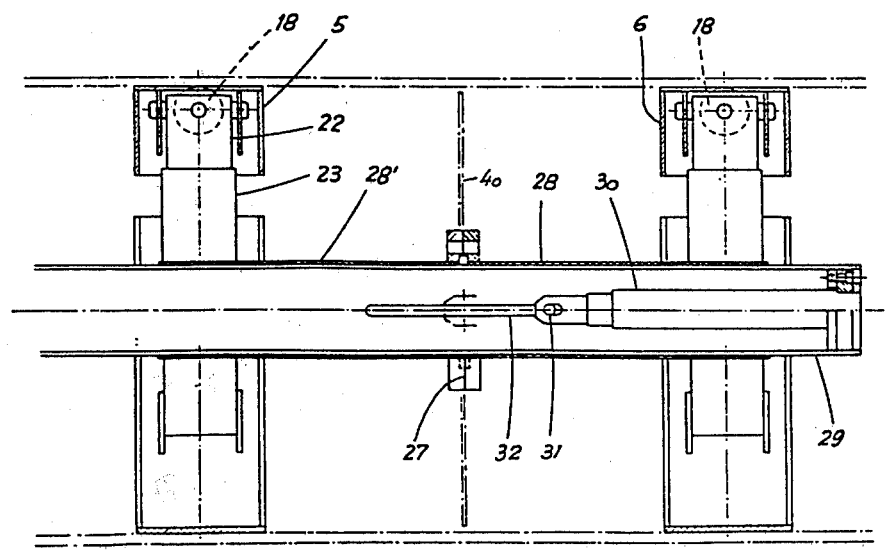
Figure 11:
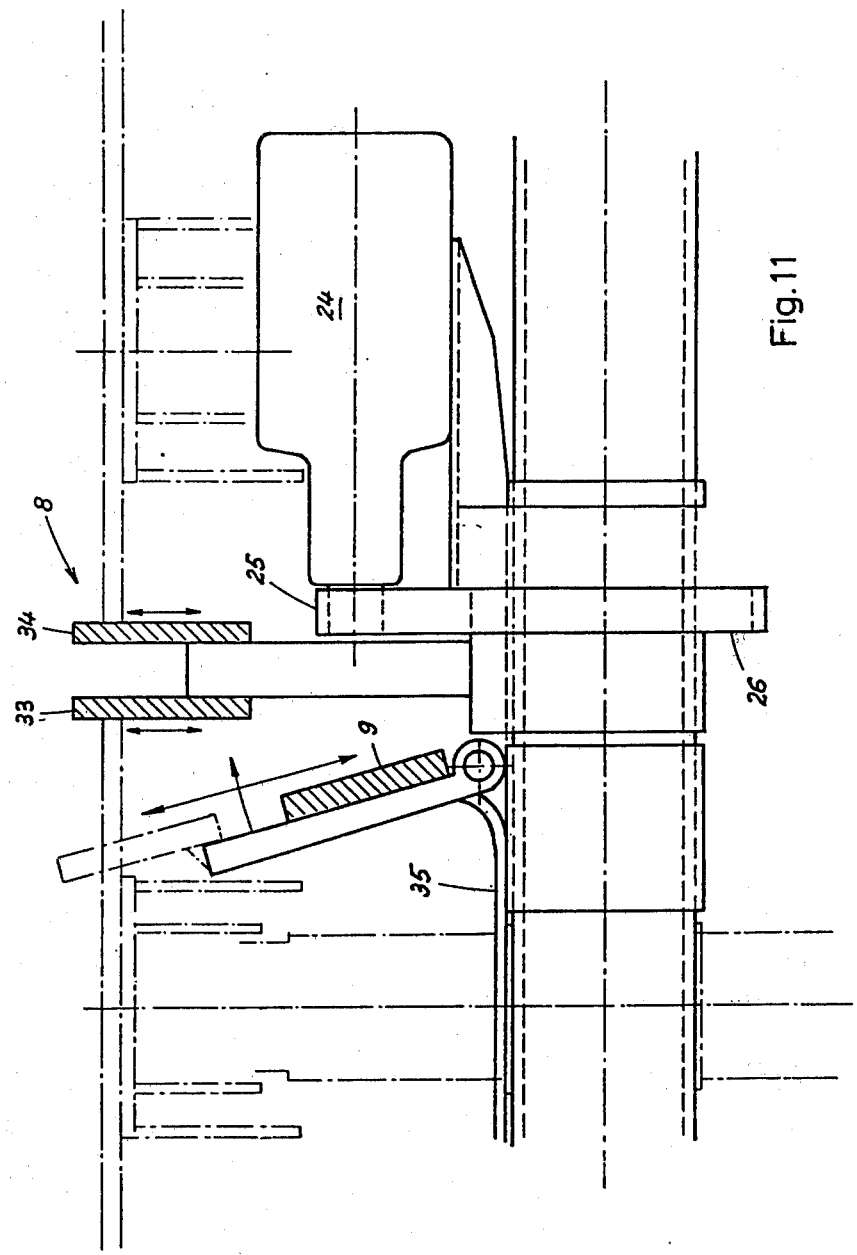

In the drawings, the respective figures show schematically:

FIG. 1 a cross-section of the welding apparatus,

FIG. 2 a longitudinal section with the turning device,

FIG. 3 a cross-section of the welding apparatus, with the welding reflector,

FIG. 4 a longitudinal section with the welding reflector in the working position, FIG. 5 a cross-section with the welding reflector retracted, FIG. 6 a longitudinal section with the welding reflector retracted, FIG. 7 a cross-section with the clamping elements retracted, FIG. 8 a longitudinal section with the clamping elements retracted, FIG. 9 a cross-section of the welding apparatus with details, FIG. 10 a longitudinal section of two clamping elements with details, FIG. 11 a longitudinal section of the arrangement of the turning device and of the retracted welding reflector, FIG. 12 an axle for the installation of a cutter device and of a reflector for joining pipes in an angle position, FIG. 13 a cutter device for pipe ends.

FIG. 1 is a schematical cross-sectional view of the welding apparatus with the longitudinal axle 1,2 and the supporting elements 3. The supporting elements 3 are hydraulically projectable and retractable. Their function is to align the pipes 15,16 to be joined, as well as to hold the pipes in position.

FIG. 2 is a schematical sectional view of the welding apparatus, with the pipes 15,16, the supporting elements 3,4,5,6 and the turning device 8, which is supported on the axle 2. The supporting elements 3 to 6 can be removed individually from the respective axle tube.

FIG. 3 is a cross-sectional view along line II—II in FIG. 4, with the welding reflector 9, which consists of four segments. In the longitudinal sectional view in FIG. 4 the welding reflector 9 is shown in the welding position.

FIG. 5 is a schematic view of the retracted segments of the welding reflector 9, FIG. 6 as a longitudinal section. In the illustration shown, two pairs of segments are pivoted to the left an two to the right. FIG. 6 shows the pipes 15,16 in a position more distant from each other, for the purpose of retracting the reflector 9. In the next operation the pipes are pressed together hydraulically for welding the heated pipe edges together.

FIG. 8 shows the welding belly 17, which, if desired, can be turned away inside the pipe by means of the turning device 8. This reduces the turbulence of the liquid to be transported in the pipes. On completion of the welding, the supporting elements 3 to 6 are retracted, in which connection, however, the rolls 18, mounted in the elements by means of springs, remain in contact with the inside face of the pipe. The apparatus can be run out of the pipe, or the pipe itself is pulled forwards to the next welding point.

FIG. 9 shows further details in connection with the axle 1, on which three support elements 3 are supported. These elements are mounted in guides 23 of square section. Between the cylinder 19, the piston 20 and the guide 22 there is a strong spring 21, which pushes the rolls 18 radially. In the angle between two support elements 3, the motor drive 24, the V-belt 25, and the pulley 26 are seen for the drive of the turning device 8. The same is shown in FIG. 11 as somewhat enlarged.

FIG. 10 is a longitudinal sectional view of the right half of the welding apparatus with the clamping elements 5,6. These are mounted on the tube 28 as separable at 27. The tube 28 glides along the tube 29. In the latter, a hydraulic piston 30 is provided, whereby a pin engages the tube 28 through the slot 32. In this way it is possible to shift the tube 28 by means of the piston 30 on the tube 29. Together with the left half, not shown, of the welding apparatus, the plastic pipes 15,16 can, in this way, be moved against each other in order to be able to perform the operations: turning, heating, pressing-together. Further, the rolls 18 are seen, which facilitate the movement of the welding apparatus in the plastic pipes 15,16. For this purpose the support elements 5,6 are retracted from their pressing position (FIGS. 7,8).

FIG. 11 shows the drive motor 24, the V-belt 25, the pulley 26, which drive the turning device. The cutter steels 33,34 can be shifted in the radial direction for the purpose of feeding, and they can also be retracted completely in order to make the pipe ends of 15,16 free for the welding process. The welding reflector 9 is shown in the retracted position. It can be positioned vertically and be projected into the welding position. At 35, the Bowden-cable is seen by means of which this movement is performed.

Pipe joint at an angle position

By means of the apparatus, pipes can also be welded together at an angle position. For that purpose the straight axle 2 is replaced by a bending axle 7 (FIG. 12). The latter carries a cutter device 36 (FIG. 13), pivotable around the axle 7'. It is provided with an arm 37, to which the drive motor 38 is mounted adjustably. The motor drives the cutter blade 39, which cuts the pipe end 11 precisely. For the purpose of cutting the opposite pipe end 12 (not shown), the drive motor 38 with the cutter blade 39 is pulled out from its mounting, and replaced as turned by 180°.

For the purpose of removing the apparatus after completed welding of the pipes, the angle locking of the axle 7 can be unlocked. A further exemplifying embodiment:

It may be avantageous to be able to control the draught air in the plastic pipe, in order to maintain the narrow heating and cooling tolerances at the welding point more precisely. For this purpose, a metal plate 40 is provided which closes almost the whole section of the pipe (FIG. 10). The access of air might also be controlled thermostatically by means of jalousies (not shown).

Control

The hydraulic drive organs are, as a rule, in the pipe to be joined, whereas the control cables are passed through the pipe to the open air up to the control units, which can be operated by the operator at the joining point of the pipes. Thus, the controlling is similar to that of a remote-controlled crane.

On the other hand, if very long pipes are concerned, such as are installed, e.g., in waters, a wireless control system may be preferable.

Moreover, especially in angular joints, it may be advantageous to insert the welding reflector from outside, because it has a larger area.

Welding reflector is the designation used for the heating device of the pipe edges. The designation turning device refers to the working of the pipe edges, irrespective of whether it is turning, cutting or sawing.

Example on the economy of the invention.

Assumption: 100 meters of pipe, diameter 800 mm, to be welded, Supply lengths of the pipe 10 meters.

|  |  | Earlier | Now |
|---|---|---|---|
| Transportation to the site + preparation | Sfr. | 1000. | 140. |
| 10 welds |  | 5900. | 700. |
| Transportation back |  | 700. | 140. |
|  | Sfr. | 7600. | 980. |

A further economic advantage lies in the use of the apparatus for relining of old pipes in the ground, with a minimum exposure of the pipes.

What is claimed is:

1. Method for welding plastic pipes of large diameter, characterized in that welding apparatus is placed inside the pipe
    said welding apparatus aligns the pipe ends (11, 12) by means of a clamping effect of the pipe ends onto a common axle (1),
    and said welding apparatus pulls the pipe ends (11, 12) together to a distance suitable for turning of the pipe ends,
    the pipe ends (11, 12) are prepared for the welding by means of turning,
    the pipe ends (11, 12) are heated by means of a reflector operating from inside the pipe,
    the pipe ends, which are still warm, are pulled together by the welding apparatus for the purpose of welding together, and
    after cooling down of the welding section, the welding apparatus releases the clamping effect and thereupon either is removed from the pipe or the pipe itself is pulled away.

2. A method as claimed in claim 1, characterized in that the pipe ends (11, 12) are heated by means of a reflector that does not operate from inside the pipe, but from outside.

3. A method as claimed in claim 1, characterized in that, after welding together of the pipe, a welding belly (17) on the inside face of the pipe is turned off and that the welding apparatus is removed from the pipe only thereinafter.

4. An apparatus for welding plastic pipe of large diameter, comprising,
    a clamping device for holding the pipe ends,
    a turning device for the pipe ends,
    a heating device for the pipe ends, and
    a pressing device for pressing the pipe ends together, characterized in that, by means of the said appparatus, all the operations can be performed from inside the pipe.

5. A welding apparatus as claimed in claim 4, characterized in that the apparatus is provided with a longitudinal axle (2), on which supporting elements (3,4,5,6) are supported, whereby the straight longitudinal axle (2) can be replaced by an axle (7) bent to an angle, and whereby further a turning device (8) or a welding reflector (9) can be supported on the said straight longitudinal axle or said bent axle (2,7).

6. A welding apparatus as claimed in claim 5, characterized in that at least one of the supporting elements and said reflector can be operated hydraulically.

7. A welding apparatus as claimed in claim 4, characterized in that a blocking device (10) is provided in order to exclude or reduce flow of air in the pipe.

8. a welding apparatus as claimed in claim 7, characterized in that the blocking device (10) can be controlled thermostatically.

* * * * *